US008977692B1

(12) United States Patent
Ackerman et al.

(10) Patent No.: US 8,977,692 B1
(45) Date of Patent: Mar. 10, 2015

(54) AUTOMATED HANDLING OF ELECTRONIC BANKRUPTCY NOTIFICATIONS

(75) Inventors: Michael S. Ackerman, Morris Plains, NJ (US); Harold Shanske, East Brunswick, NJ (US); Richard Baylor, Fanwood, NJ (US); James J. Polera, Plainsboro, NJ (US); Nathan Brenner, Woodcliff Lake, NJ (US); Frances Bell, Maplewood, NJ (US); Daniela Sellinger, Scotch Plains, NJ (US); Kathleen M. Barnum, Cedar Knolls, NJ (US); W. C. Taylor, III, North Dover, NJ (US)

(73) Assignee: 4 S Technologies, LLC, Mountainside, NJ (US)

( * ) Notice: Subject to any disclaimer, the term of this patent is extended or adjusted under 35 U.S.C. 154(b) by 1168 days.

(21) Appl. No.: 11/491,549

(22) Filed: Jul. 21, 2006

Related U.S. Application Data

(60) Provisional application No. 60/725,386, filed on Oct. 11, 2005.

(51) Int. Cl.
*G06F 15/16* (2006.01)
*G06Q 10/10* (2012.01)
*G06Q 50/18* (2012.01)

(52) U.S. Cl.
CPC ............... *G06Q 10/10* (2013.01); *G06Q 50/18* (2013.01)
USPC ........................................................ 709/206

(58) Field of Classification Search
CPC ............................... G06Q 10/10; G06Q 50/18
USPC ........................................................ 709/206
See application file for complete search history.

(56) References Cited

U.S. PATENT DOCUMENTS

| 6,564,321 | B2* | 5/2003 | Bobo, II ..................... 713/168 |
| 6,654,735 | B1* | 11/2003 | Eichstaedt et al. ........... 707/749 |
| 6,694,315 | B1* | 2/2004 | Grow ................................. 1/1 |
| 6,772,149 | B1 | 8/2004 | Morelock et al. |
| 2002/0172335 | A1* | 11/2002 | Narasimhan et al. .... 379/106.02 |
| 2003/0033167 | A1* | 2/2003 | Arroyo et al. .................... 705/1 |
| 2004/0019496 | A1 | 1/2004 | Angle et al. |
| 2004/0064404 | A1 | 4/2004 | Cohen et al. |
| 2004/0098284 | A1* | 5/2004 | Petito et al. ..................... 705/1 |
| 2005/0021540 | A1* | 1/2005 | McKee et al. ................ 707/100 |
| 2005/0187807 | A1 | 8/2005 | Delatte et al. |
| 2005/0216555 | A1 | 9/2005 | English et al. |
| 2006/0206490 | A1* | 9/2006 | Schiller ......................... 707/10 |
| 2006/0271450 | A1* | 11/2006 | Cohen et al. .................... 705/30 |

* cited by examiner

*Primary Examiner* — Evans Desrosiers
*Assistant Examiner* — Lawrence Cosby
(74) *Attorney, Agent, or Firm* — Mark K. Young; Mayer & Williams PC

(57) ABSTRACT

Automated handling of a notification from a federal court is provided in which its disposition is determined responsively to data contained in the notification, or to data that relates to a matter referred to in the notification. In an illustrative example, an email application identifies an email as a bankruptcy notification. An automated notification handling system enhances the data in the notification email by supplementing the notification email data with related data that is matched from a case management system database, and further follows links in the notification email to download documents that are filed with the court. The documents are copied to storage or appended to the enhanced notification email data. The disposition of the notification is determined by invoking rules responsively to the enhanced notification email data which is then sent, using rules-based routing, to an appropriate destination to be handled, stored or deleted as required.

39 Claims, 17 Drawing Sheets

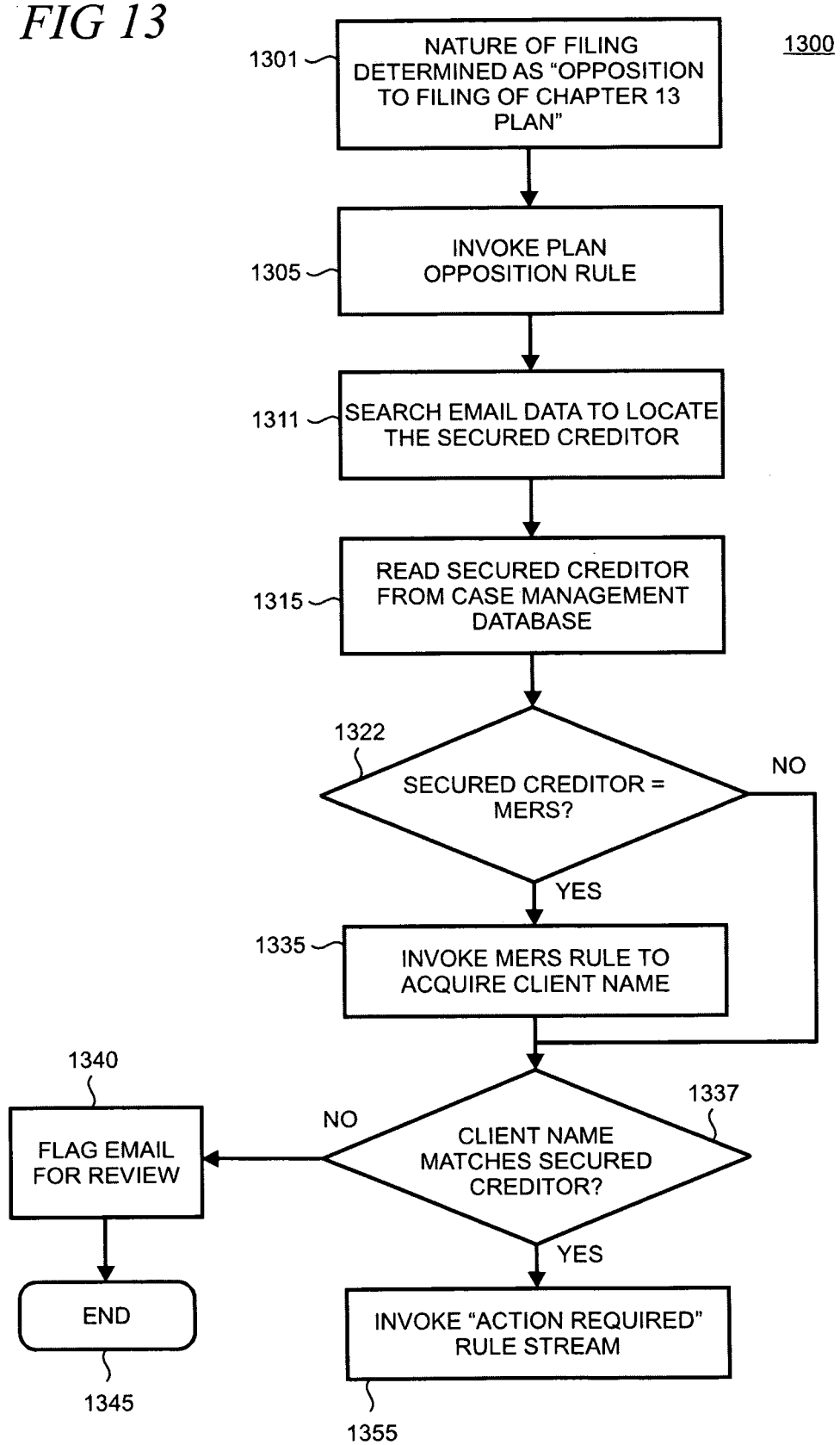

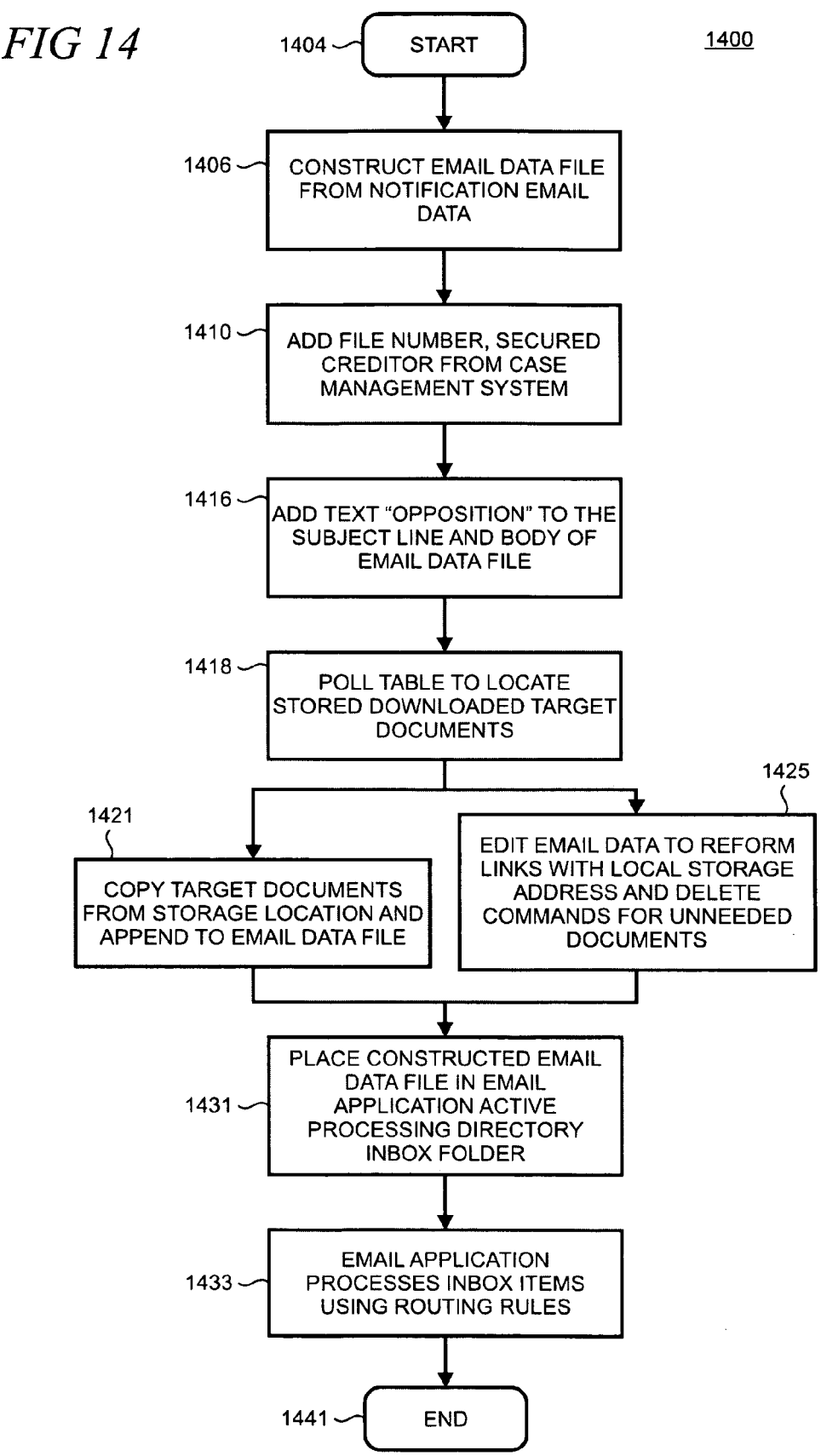

FIG 15

Rules and Alerts

| E-mail Rules | Manage Alerts |

New Rule ... Change Rule ▼ 📋 Copy... ✕ Delete | ⇧ ⇩ Run Rules Now... Options

| Rule (applied in the order shown) | Actions |
| --- | --- |
| ☑ Response | ✕ 🛠 |
| ☑ Reopen BK Case | ✕ 🛠 |
| ☑ Receipt of Case Reopening | ✕ 🛠 |
| ☑ Reaffirmation Agreement | ✕ 🛠 |
| ☑ Prospective Relief | ✕ 🛠 |
| ☑ Pre-Trial Memorandum | ✕ 🛠 |
| ☑ Opposition | ✕ 🛠 |
| ☑ Notice General | ✕ 🛠 |

Rule description (click underlined value to edit):

Apply this rule after the message arrives
with Opposition in the subject
forward it to david.smith@lawfirm.com
and delete it

[ OK ]  [ Cancel ]  [ Apply ]

1500

1505

1508

AUTOMATED HANDLING OF ELECTRONIC BANKRUPTCY NOTIFICATIONS

STATEMENT OF RELATED APPLICATION

This application claims the benefit of U.S. Provisional patent application Ser. No. 60/725,386, filed Oct. 11, 2005, entitled "Automatic Bankruptcy Court Notification Handling System," which is incorporated herein by reference in its entirety.

BACKGROUND

The United States courts dealing with bankruptcy cases allow parties filing actions in connection with the cases to make those filings electronically. An electronic portal for filing is available for making the entries to post the filings, and the documents are delivered into the portal for the Bankruptcy Court in Adobe® PDF ("Portable Document Format) format. In order to identify the filing, the Court's portal further requires that the filing party identify the bankruptcy "Case Number," choose within general categories the action being filed, and also to enter a free-form description of the filing—whether it be a motion, order, etc. All users of the filing portal must register an electronic address (i.e., an email address) for the court's use in making notifications of filings, notices or any other type of notification that the court initiates.

The electronic address is also the "official" notice address for counsel representing any party to a bankruptcy case. All such notifications from the federal court are, thus, delivered by email (following the initial notification from the court to the creditors named in the debtor's initiation of a bankruptcy chapter filing, which are made via U. S. mail). The notification emails are structured as to the data which is presented within the subject line and within the body of the email, and a link to one or more PDF files which embody an image (or images) of the filing itself is included in the body of the email. An intermediary company—PACER—provides subscription-based access to court proceeding records. The links to the PDF versions of the filed documents provide the access paths to the documents through PACER.

While the emails are structured as to the data which is presented regarding the filing which is the subject of the notification, the structure is limited to placement of information, but the data presented is subject to what has been input to the filing portal. The filing portal, as noted above, requires the identification upon entry of a filing by selection of the general type of filing and also by entry of the free-form description of the filing. Consequently, the information describing the filing which is contained within the notification email is not inherently identifiable. All filings are distributed through the electronic notification system and the filing party receives notification of its own filings in addition to those of other parties and petitioners. In addition, the filing party receives a confirmation email from the filing portal of the filing having been made, accepted and the fee charged. Therefore the filing party handles the filing twice after the filing is made where at least one (the notification) is generally unnecessarily. A law firm handling many bankruptcy cases, representing either creditors or debtors, or any other party to the bankruptcy action, receives notification of all filings related to the bankruptcy case. A determinative review of the notification email must typically be performed by trained personnel to ascertain whether the filing is pertinent to the receiving counsel's (and its client's) interest. This requires identification of the notification and, in particular, identification of a cross-reference of the case number to the client matter as well as determination of the pertinence to the recipient's interest in the case.

While the "self-filed" notifications (and corresponding confirmations) are readily identifiable, notifications of filings by other parties must be identified as to the nature of the filing and, in many cases, the specifics of the claims, assertions or evidence presented within the filings must be determined by a review of the actual filed documents contained in the PDF files. The debtor name and/or case number presented in the notification email are usable, for example, by the recipient to identify the recipient's case file. The links to the filed documents takes an initiator into PACER on a one-time-free access "pass" to view the PDFs associated with the filing (the "target" or "targets" of the link). During that one-time free access the document can be downloaded by a user through standard "Save Target As" browser functionality.

The nature of the filing is the catalyst for determination of all required bankruptcy related actions made by a counsel representing a creditor, as the creditor is the defendant in the action. Filing timeframes for reaction by a creditor of the debtor to debtor actions and/or to competing creditor actions exist which limit the time a creditor has available to make filings required to protect its interest. Consequently, thoroughness and expedience are paramount when handling the court notifications dealing with bankruptcy matters.

Unfortunately, thoroughness and expedience can be extremely difficult to achieve given 1) the time consuming steps required to cross-reference and identify the matter; 2) the complexity of the determinative review of the circumstances and details of the filings; 3) the volume of filing notifications which are received by a law firm specializing in bankruptcy representation; and 4) redundancy in notification which exacerbates the volume of notifications.

SUMMARY

Automated handling of a notification from a federal court is provided in which a disposition of the notification is determined responsively to data contained in the notification, or to data that is related to a matter referred to in the notification. In an illustrative example, an email application identifies an email as a bankruptcy notification from a federal court. An automated notification handling system enhances the data in the notification email, when necessary for ease of review, by supplementing the notification email data with related data that is cross referenced (i.e., matched) from a case management system database. Such related data may include, for example, an internal file number and the identification of a client (for example, a secured creditor holding an interest in the bankruptcy matter to which the notification email pertains).

The automated notification handling system further identifies and then follows links embedded in the notification email to locate and then download one or more documents that have been filed with the federal court. The downloaded documents are copied to local storage, or alternatively appended to the enhanced notification email data or delivered to a desired location using FTP (File Transfer Protocol) in a file such as an XML (eXtensible Markup Language) document. The disposition of the notification is determined in an automated manner by invoking rules responsively to the enhanced notification email data that matches pre-determined search criteria. The enhanced notification email data is then sent, using rules-based routing, to an appropriate destination or personnel for further handling if required, or stored or deleted if no further handling is needed.

Advantageously, the present invention provides an efficient, accurate and reliable arrangement for automated handling of a large volume of filing notifications to thereby reduce the need for expensive determinative review by knowledgeable personnel. In addition, the automated downloading reduces costs, among other reasons, by effectively utilizing the free access pass to the filed documents in PDF format on the PACER system. Also realized is the reduction in the inherent risks associated with relying upon an individual to both remember to download the documents (to thereby avoid paying a fee for a second access to the document database) and then store the downloaded documents in an appropriate location (so that the documents are readily accessible to others).

DESCRIPTION OF THE DRAWINGS

FIG. 13 is a flow chart for an illustrative rule stream for handling a notification pertaining to an opposition to a filing of a Chapter 13 plan;

FIG. 14 is a flow chart for an illustrative "action required" rule stream;

FIG. 15 is a screen shot of an illustrative user interface for interacting with rules- based email routing as may be implemented using a commercially available email application;

DETAILED DESCRIPTION

Figure 1:
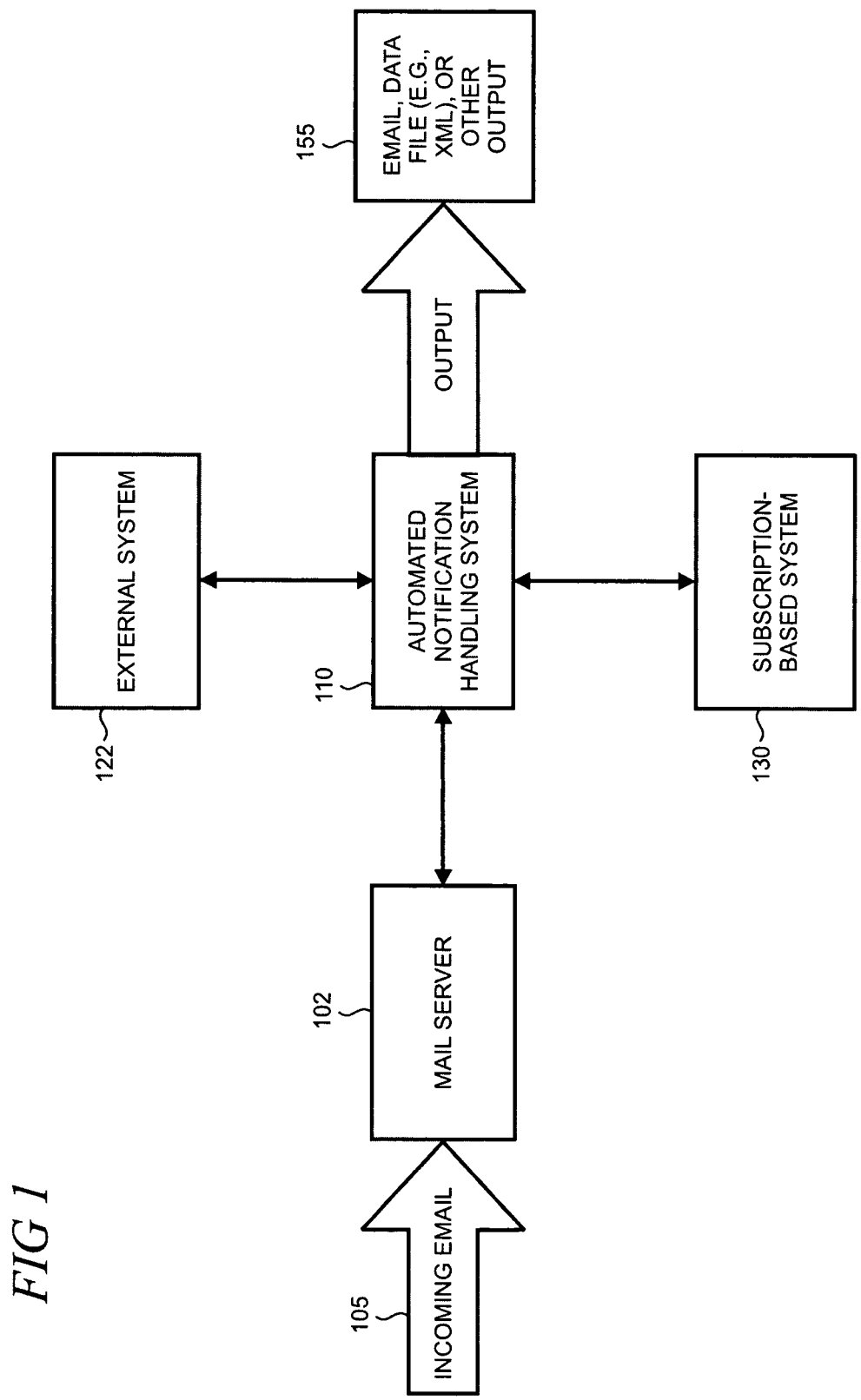
FIG. 1 is a block diagram of a first illustrative high-level architecture for automated notification handling which employs an email server to capture notifications from a federal court.

FIG. 1 is a block diagram of a first illustrative high-level architecture for automated notification handling which employs an email server to capture notifications from a federal court. In this illustrative example, a bankruptcy setting is described. However, it is emphasized that other settings are also well supported and may benefit from the present arrangement including title, foreclosure, loan and other legal settings.

As shown in FIG. 1, a mail server 102 is arranged to receive an incoming email stream 105. The incoming email stream 105 is typically generated from a plurality of external sources (not shown). Mail server 102 is operatively coupled to an automated notification handling system 110 which, in turn, is operatively coupled to an external system 122 and a subscription-based system 130. Mail server 102 is arranged for generating a message which is transmitted to automated notification handling system 110 as described in more detail below. Automated notification handling system 110 generates an output 155 comprising an email data file, a data file such as an XML file or other output type as may requied by a specific application of the invention.

External system 122 is arranged, in this illustrative example, as a case management system database that is typically utilized by law firms and other organizations to store data relating to matters being handled in an organized and structured manner. Such systems often include search, docketing, billing and report generation capabilities, among other common features. External system 122 is typically accessed by automated notification handling system 110 using a network connection such as an Ethernet or wireless networking (e.g., WiFi) connection to thereby access an intranet or external network such as the Internet.

Subscription-based system 130 is arranged, in this illustrative example, as a system provided by PACER which accordingly stores bankruptcy documents that are electronically filed with a federal court. Automated notification handling system 110 typically accesses the subscription-based system 130 over an Internet connection. In alternative arrangements, other subscription-based systems are used to provide access to data, records and documents. Such subscription-based systems generally require particular access privileges be established to authenticate authorized users. In some applications, logins and passwords are used.

Figure 2:
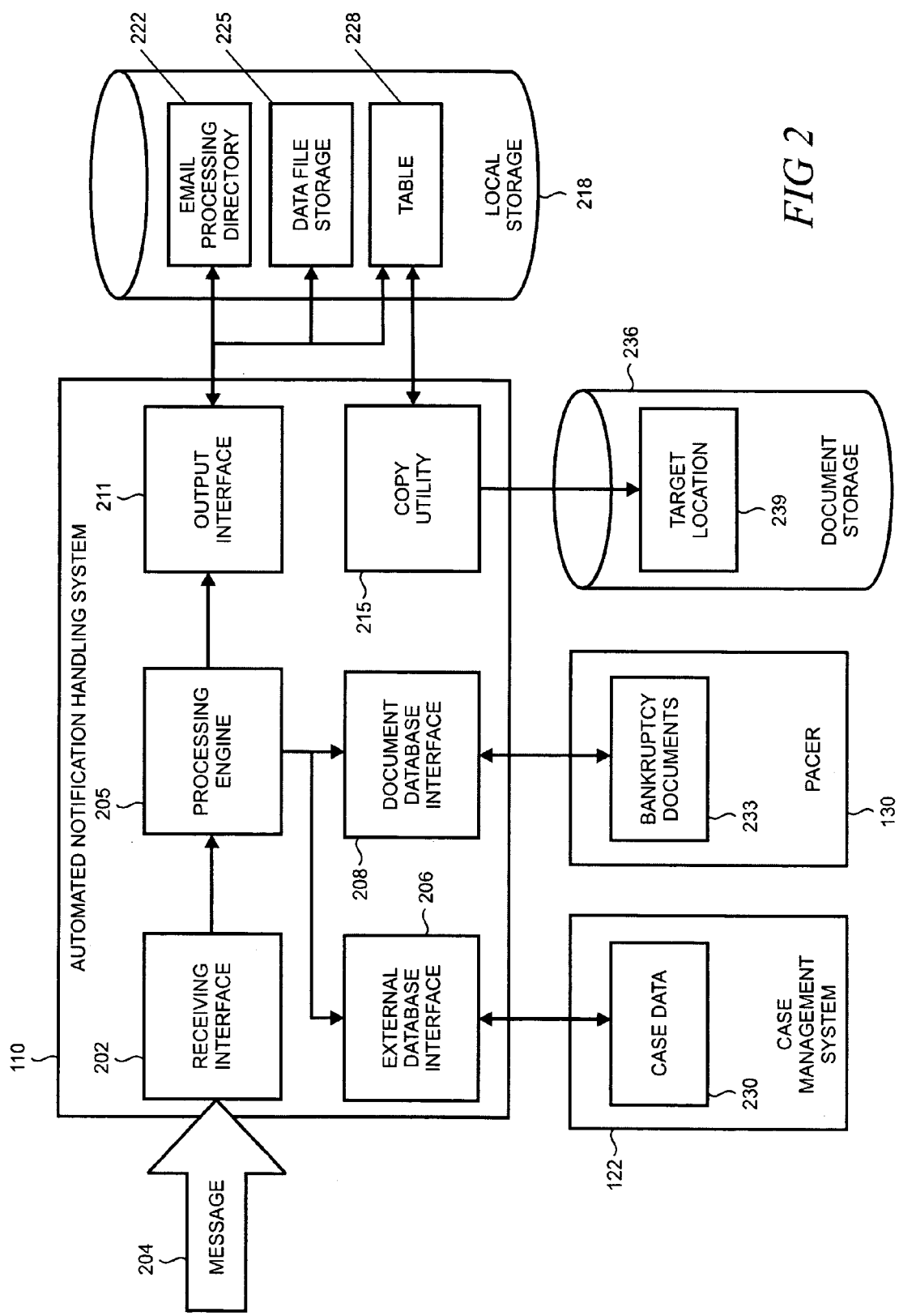
FIG. 2 is a block diagram showing functional details of an illustrative automated notification handling system.

FIG. 2 is a block diagram showing functional details of the illustrative automated notification handling system 110. A receiving interface 202 is arranged to receive a message 204 from the mail server 102 shown in FIG. 1. A processing engine 205 is operatively coupled to the receiving interface 202 as well as an external database interface 206, a document database interface 208 and an output interface 211, as shown. Automated notification handling system 110 further includes a copy utility 215.

Output interface 211 is arranged to write data to local storage 218 that is commonly configured as part of an application and/or data server in an office environment such as that found in a law firm. In some application of the invention, it may be desirable for local storage 218 to be implemented in a common server that hosts the automated notification handling system 110.

In this illustrative example, output interface 211 accesses, and writes to, a variety of alternative output locations in local storage 218 including an email processing directory 222, a data file storage area 225 and a table 228. Output interface 211 is commonly coupled to local storage 218 using a local networking interface such as wired or wireless Ethernet to thereby couple to an intranet or external network such as the Internet.

External database interface 206 is arranged to communicate with case management system 122 in order to read case data 230 disposed therein and update case data 230 (i.e., write data to case management system 122). Document database interface 208 is arranged to communicate with a subscription-based system which, in this example, is PACER 130. Communication between documents database interface 208 and PACER 130 enables links embedded in incoming notification email messages to be followed by automated notification handling system 110 to locate and then download bankruptcy documents 233. It is noted that some notification emails are linked to a single bankruptcy document. Other notification emails are linked to more than one bankruptcy document. In the description that follows, the use of the plural term "bankruptcy documents" is intended to refer either situation.

Copy utility 215 in automated notification handling system 110 is arranged with interfaces to table 228 in local storage 218 and document storage 236. Document storage 236 is typically arranged as part of an application/data server. In some applications, document storage 236 is discretely arranged, while in alternative applications it may be arranged to share components or architecture features with local storage 218.

Copy utility, as described in detail below, operates to copy documents from local storage 218 to document storage 236, and in particular from a subdirectory referenced in table 228 to a target storage location 239, as shown in FIG. 2. In many applications, copy utility communicates with local storage 218 and document storage 236 over a local area network link such as wired or wireless Ethernet.

Figure 3:
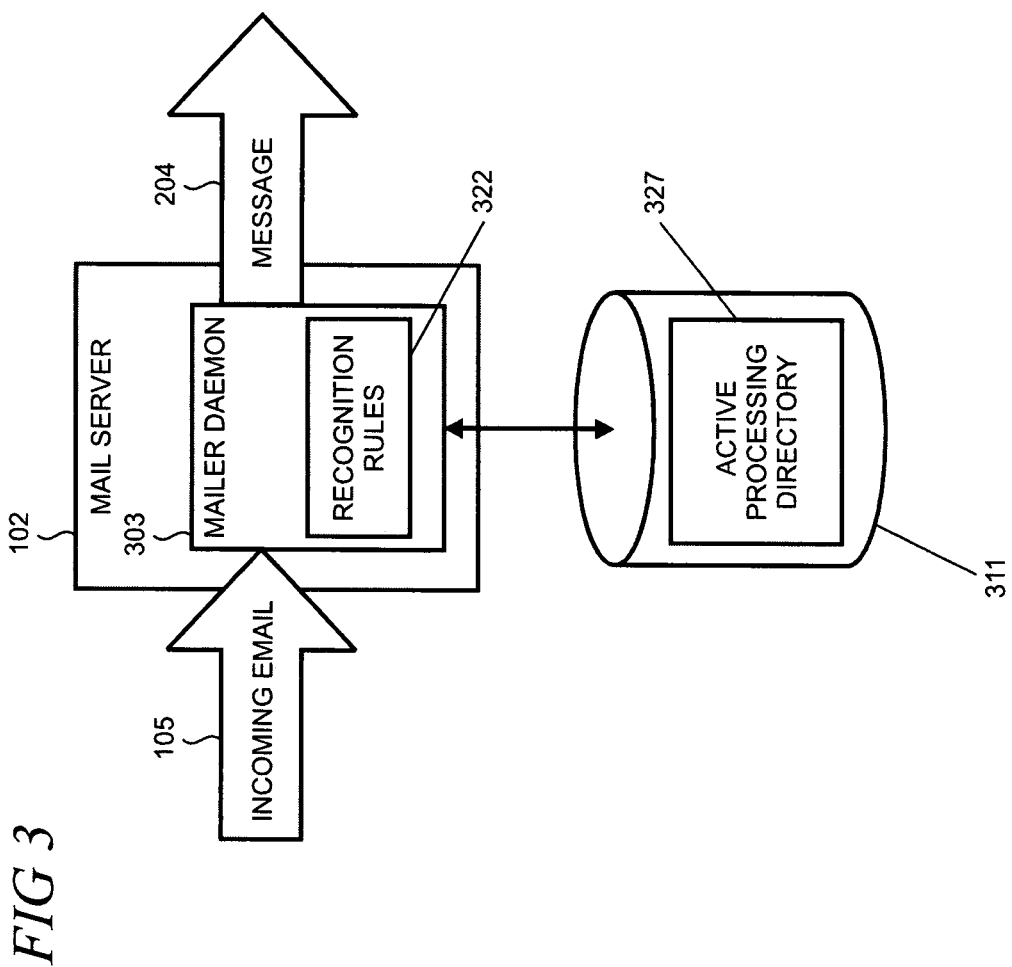
FIG. 3 is a block diagram showing details of an illustrative mail server.

FIG. 3 is a block diagram showing details of the illustrative mail server 102 shown in FIG. 1. Mail server 102 includes a mailer-daemon application 303 which includes recognition rules 322 and memory 311 such as hard disk drive, server or other storage device that includes storage for an active processing directory 327. Memory 311 is optionally configurable so that local storage 218 (FIG. 2) is hosted on the same hard disk drive, server, or storage device. That is, depending on the requirements of a specific application of automated notification handling, the various output locations supported by local storage 218 may be optionally incorporated into the memory 311.

As shown in FIG. 3, an incoming email stream 105 is received at mail server 102. The mailer-daemon application 303 running on mail server 102 applies recognition rules 322 to identify bankruptcy notification emails from the email stream 105. mailer-daemon 303 stores data from the notification email (or alternatively the notification email itself) in the active processing directory 327 and responsively generates message 204 to indicate to automated notification handling system 110 that notification email data was written to the active processing directory 327.

Figure 4:
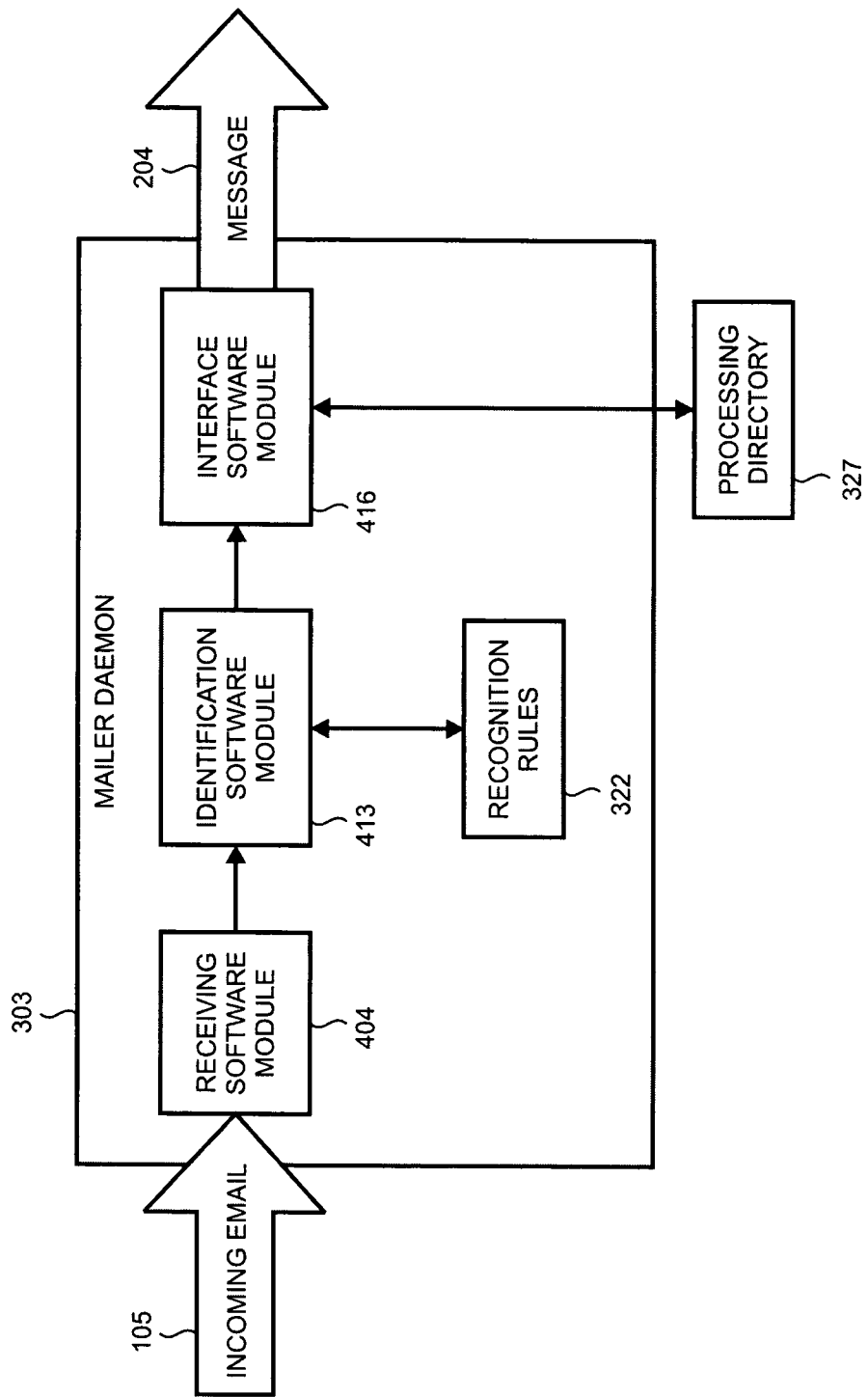
FIG. 4 is a block diagram showing components of an illustrative mailer-daemon application.
Figure 8:
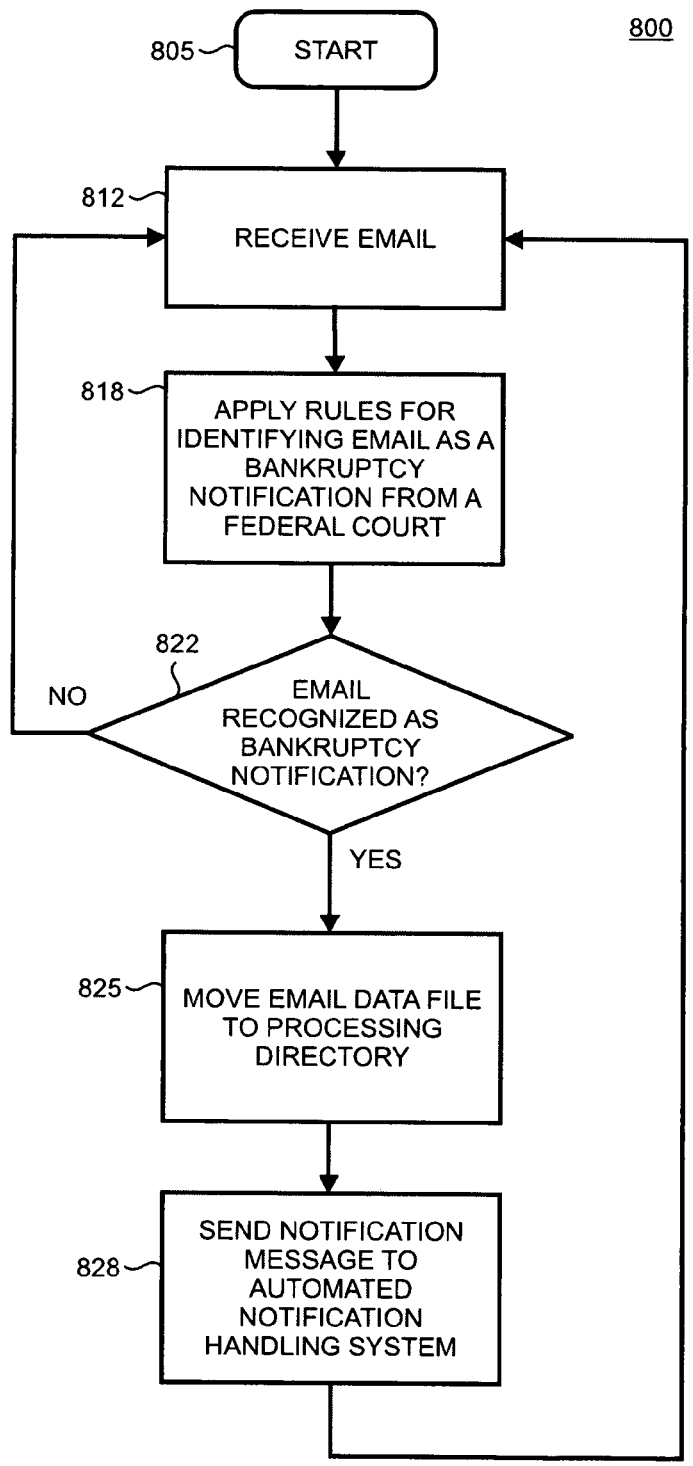
FIG. 8 is a flow chart showing an illustrative automated method for identifying an incoming email as a bankruptcy notification.

FIG. 4 is a block diagram showing components of mailer-daemon application 303 including a receiving software module 404, an identification software module 413 and an interface software module 416. Receiving software module implements functionality required to receive the incoming email stream 105 and then pass the received email messages to the identification software module 404. Identification software module 404 applies recognition rules 322 stored in memory 311 (as shown in FIG. 8 and described in the accompanying text) to identify bankruptcy notification emails from a federal court. Interface software module 416 stores identified notification email data in the active processing directory 327 and generates message 204.

Figure 5:
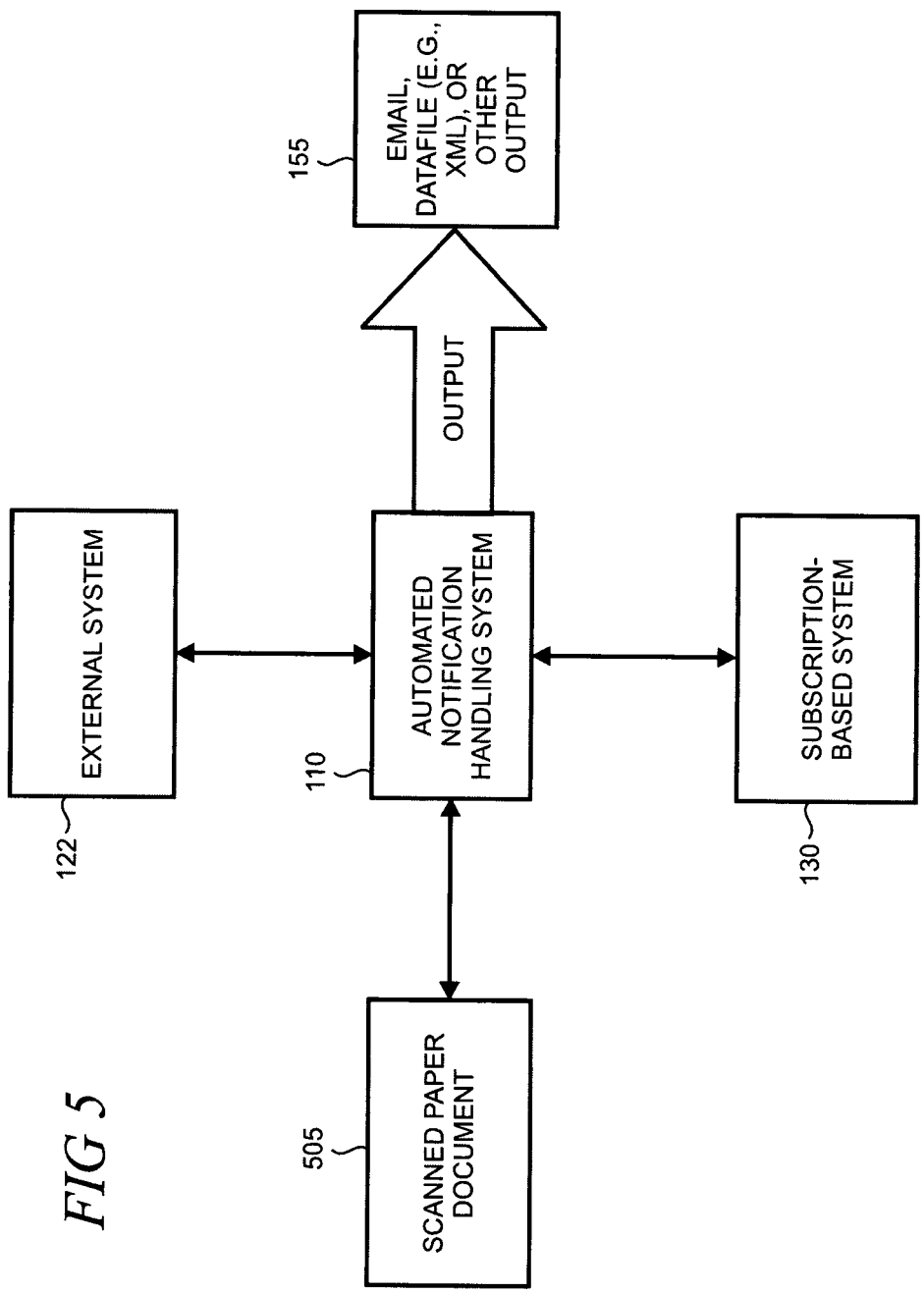
FIG. 5 is a block diagram of a second illustrative high-level architecture for automated notification handling which employs scanned paper documents to represent notifications from a federal court.

FIG. 5 is a block diagram of a second illustrative high-level architecture for automated notification handling which employs scanned paper documents to represent notifications from a federal court. In this illustrative example, the input to the automated notification handling system 110 is an electronic scan of a paper document. The paper document typically comprises a printed notification email, or alternatively a bankruptcy document as filed with a federal court and available for download from PACER or an printed image of a previously scanned bankruptcy document that was not acquired from PACER, for example. The arrangement of FIG. 5 provides an alternative arrangement to the mail server 102 shown in FIGS. 1, 3 and 4 in cases where it may be desirable or necessary to forgo the automated notification email identification feature described herein. However, scanning provides equivalent digital data capture when commonly available optical character recognition applications are employed.

Figure 6:
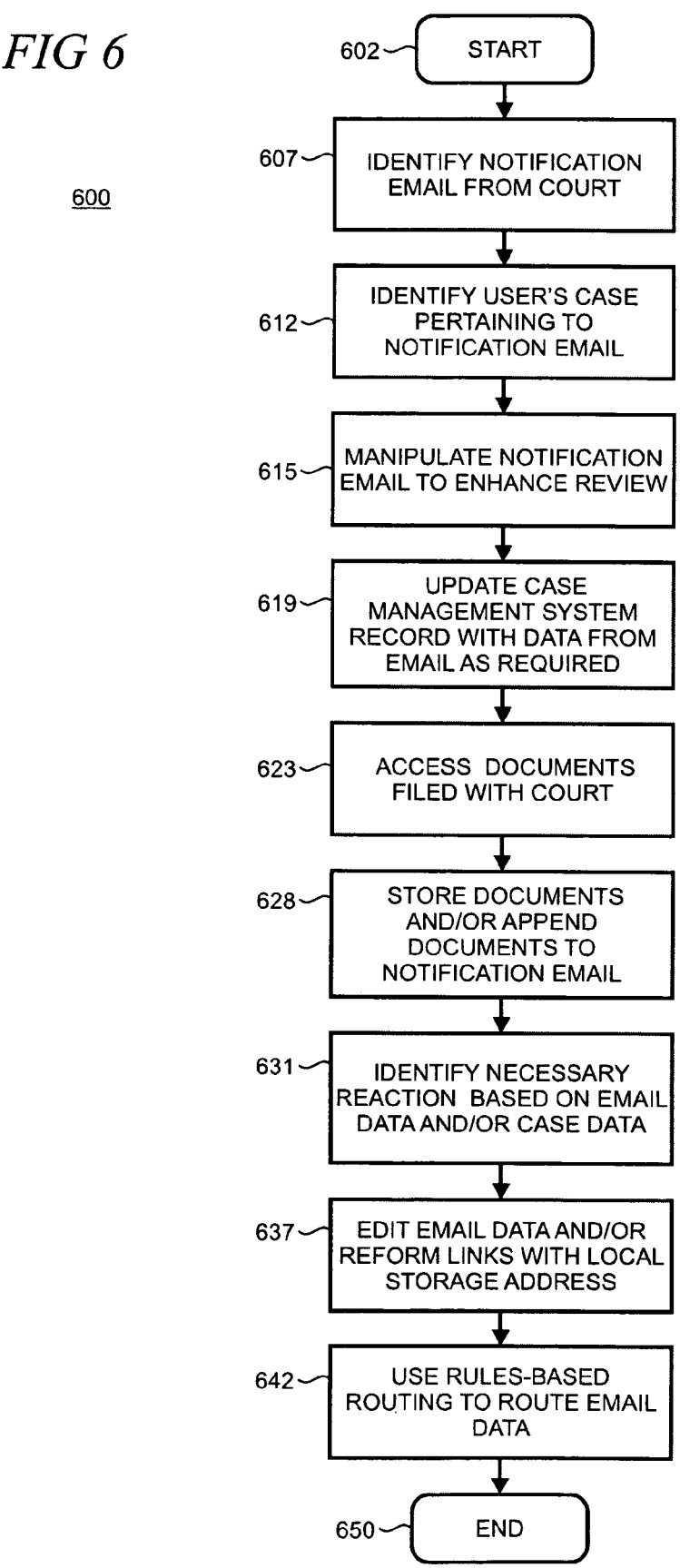
FIG. 6 is a flow chart showing an illustrative method for providing automated notification handling.

FIG. 6 is a flow chart showing an illustrative method 600 that provides an overview of automated notification handling in accordance with the present invention. Method 600 may be performed, for example, using the arrangement shown in FIG. 1. The method starts at block 602. At block 607, a bankruptcy notification is identified, for example, by mailer-daemon application 303 (FIG. 3) running on mail server 102 (FIG. 1). After a bankruptcy notification email is identified from the email stream, mailer-daemon application 303 places the bankruptcy notification email data into the active processing directory 327. Message 204 (FIG. 2) is generated and transmitted to automated notification handling system 110 to notify it that a notification email has been received and is available for further processing.

Aside from recognizing the bankruptcy notification email among other types and variety of email forming the incoming email stream, the identification process performed by mailer-daemon application 303 further includes scraping the court case number from the notification email. Other information may also be scraped from the notification email, including the name of the secured creditor, the nature of the filing, and other data as may be required in a particular application of automated notification handling.

At block 612, the court case number scraped from the notification email is used to identify a user's case file that corresponds to the case number. This is accomplished by searching the case management database 122 (FIG. 2) to locate a matching file (or files) that contain the court case number. Such case files typically include a variety of pertinent information that is related to the matter referred to in the notification email including, for example, a user's file number and the identification of the user's client that is associated with the case, such as a secured creditor. Note that users of the present arrangement are contemplated as law firms, creditors and other parties or entities involved in the management or disposition of bankruptcy activities, typically on a volume basis. Thus a user's file number is typically the law firm's internal identification number or file number. In this illustrative example, the search and match function is performed by automated notification handling system 110 (FIG. 1).

At block 615, the notification email is enhanced to make any subsequent review by personnel (such as law firm employees including administrators, paralegal staff and attorneys) when required or desired easier, more accurate and less time consuming. The term "enhanced" as used herein means any of a variety or combination of manipulation, addition, modification, reconstruction or edit of the notification email performed in an automated matter as may be required to expedite the handling of the notification email. Thus, automated notification handling system 110 implements such enhancements by accessing the notification email data and editing it to include the law firm's file number and/or client identification, for example, depending on the requirements of a specific application. At block 619, case data in an external system 230 (FIG. 2) is updated with data from the notification email. A specific example of such updating is provided below in the text accompanying FIG. 12.

Illustrative method 600 continues at block 623 where documents filed electronically with the court are accessed by automated notification handling system 110. In this illustrative example, automated notification handling system 110 accesses documents from the PACER system 130 (FIG. 2) by following links contained in the notification email. The method invoked for accessing the PACER documents is described in detail in the text accompanying FIG. 9.

At block 628, automated notification handling system 110 stores the downloaded documents referred to in table 228 (FIG. 2). More specifically, such storage is accomplished by storing the document and creating a command line as described below in the text accompanying FIG. 9. Copy utility 215 (FIG. 2) is configured to poll table 228 and copy the downloaded documents to the target location 239 (FIG. 2). Optionally, automated notification handling system 110 appends the downloaded documents to the enhanced notification email or writes the data from the downloaded documents to data file storage 225 (FIG. 2) which is subsequently deliverable to another location or user, for example as an XML file using FTP.

It is noted that the method steps shown in blocks 623 and 628 are optionally performed in a parallel (i.e., concurrent) manner with the method steps shown in blocks 612 and 615.

At block 631, automated notification handling system 110 identifies the necessary reaction to the notification email. Inputs to the determination of an appropriate disposition for the notification email include, for example, data included in the notification and related case data 230. The use of a variety of search string criteria in combination with a plurality of rule streams enables, for example, automated identification of 1) automated identification of the nature of the filing; 2) automated determination of any requirement to address the notification and/or filing; and 3) automated determination of the required next action. Several illustrative alternative dispositions determined by automated notification handling system 110 in the method step shown in block 631 are shown in FIG. 7 and described in the accompanying text.

At block 637 in FIG. 6, automated notification handling system 110 reconstructs or enhances the notification email data to reform the embedded PACER links to point to the target location 239. This step is considered optional in cases where automated notification handling system 110 appends the downloaded documents to the enhanced notification email as described at block 628. Automated notification handling system 110 outputs the enhanced notification email (and appended documents when applicable) to email processing directory 222 (FIG. 2). In addition, the reconstructed notification email data may include a provision to delete links to the PACER documents which may enhance productivity in instances when the documents are not required or desired.

At block 642, rules-based routing of the enhanced notification email is performed. In this illustrative example, a commercially available email application (for example Microsoft Outlook®) is used to implement the rules-based routing methodologies in accordance with the present arrangement for automated handling of electronic bankruptcy notifications. Pre-defined routing rules are input into the email application and the "Rules and Alerts" functionality effectuates string searches of the enhanced notification email subject line, body and/or email sender to implement, for example 1) automated routing to a responsible party for action; 2) automated routing to a file or storage location; and, 3) automated disposal of notifications not requiring action. The illustrative method 600 ends at block 650.

Figure 7:
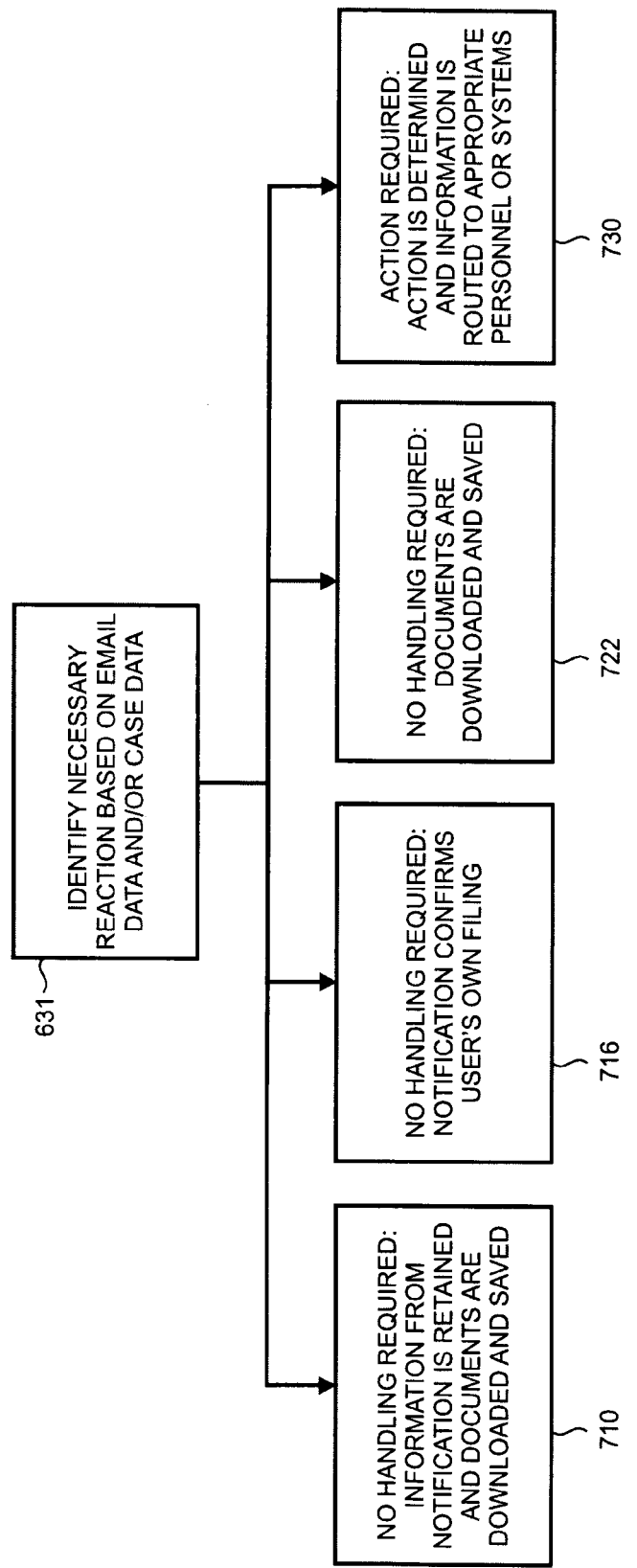
FIG. 7 is an illustrative flow chart that shows a number of alternative dispositions of a notification.

FIG. 7 is an illustrative flow chart that shows a number of alternative dispositions of a notification email that may be determined by automated notification handling system 110 (FIG. 1). While FIG. 7 shows four illustrative alternatives, it emphasized that other dispositions may be selected to address the requirements of a specific application of the invention. Note that these alternatives are also described with additional detail in the specific examples discussed below in the text accompanying FIGS. 10-14.

Block 710 shows a first alternative disposition for a notification email. Automated notification handling system 110, upon the application of string searches and rule streams to the notification email data and related case data, determines that no subsequent handling of the notification email is required. However some data or information from the notification email is retained. In addition, documents linked to in the notification email are downloaded and saved.

Block 716 shows a second alternative disposition for a notification email. Automated notification handling system 110, upon the application of string searches and rule streams to the notification email data determines that no handling is required because the notification email is a confirmation of the user's (e.g., law firm's) own bankruptcy filing.

Block 722 shows a third alternative disposition for a notification email. Automated notification handling system 110, upon the application of string searches and rule streams to the notification email data and related case data determines that no handling is required but documents linked to in the notification email are downloaded and saved.

Block 730 shows a fourth alternative disposition for a notification email. Automated notification handling system 110, upon the application of string searches and rule streams to the notification email data and related case data determines that action is required. In this case, an action that is responsive to the notification email is determined and the enhanced notification email (and appended downloaded documents, as required) are routed to appropriate personnel for subsequent handling.

FIG. 8 is a flow chart showing an illustrative automated method 800 for identifying an incoming email as a bankruptcy court notification. In this illustrative example, method 800 is performed by the mailer-daemon application 303 (FIG. 3) running on mail server 102 (FIG. 1). The illustrative method starts at block 805.

At block 812 an incoming email stream 105 (FIG. 1) is received by mail server 102 and mailer-daemon application 303. At block 818, mail server rules are applied to enable recognition that an email matches pre-defined criteria, and thus, may be identified as a bankruptcy notification email from a federal court. In this illustrative example, the rules comprise matching both the sender's email address and recipients email address to stored search strings. Only if both addresses are matched is an email identified as a bankruptcy notification email.

At decision block 822, if an email is recognized, the process continues at block 825. Otherwise, control is passed back to block 812 and the process of receiving and screening email continues in an iterative manner. At block 825, the mailer-daemon application 303 moves the identified notification email data to the active processing directory 327 (FIG. 3). At block 818, message 204 (FIG. 2) is sent to automated notification handling system 110 (FIG. 1). In some applications of the invention, message 204 is used as a trigger for the executable code forming automated notification handling system 110. Control is returned to block 812 and the above-described method is performed in an iterative manner as emails arrive at the mail server 102.

Figure 9:
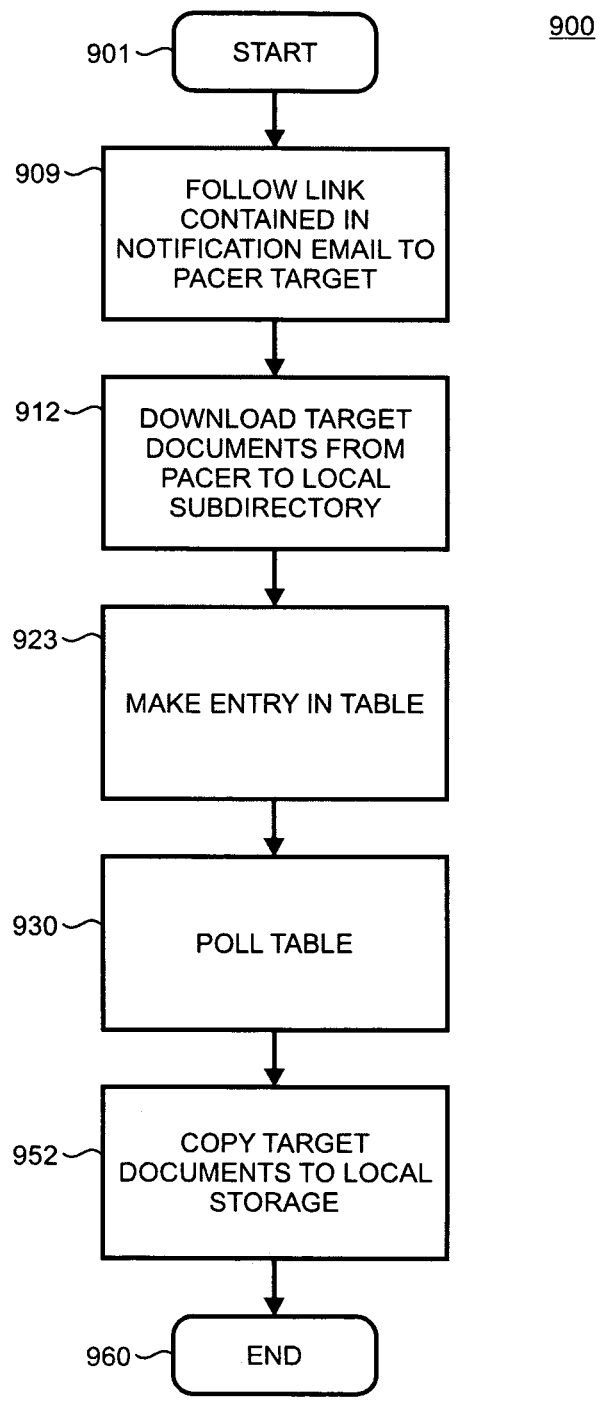
FIG. 9 is a flow chart showing an illustrative automated method for locating and downloading documents linked to in a bankruptcy notification.

FIG. 9 is a flow chart showing an illustrative automated method 900 for locating and downloading documents linked to in a bankruptcy notification. In this illustrative example, method 900 is performed by automated notification handling system 110 (FIG. 1) which accesses the PACER system 130 (FIG. 2). As noted above, the method for locating and downloading documents is alternatively performed in a parallel manner to other processes implemented by automated notification handling system 110.

The illustrative method 900 starts at block 901. At block 909, the automated notification handling system 110 follows links embedded in the notification email data to documents located on the PACER system 130. Automated notification handling system 110 is arranged to emulate a user's access to follow the link provided in the notification email, through a log-in to PACER (which does not present itself when an individual user accesses via click-through of the link and invokes a browser session rendering the page targeted in the link), to thereby arrive at the PDF in the PACER system 130. Accordingly, automated notification handling system 110 is arranged to follow multiple links contained in the notification email, as may be required, to arrive at the PDF target.

At block 912, automated notification handling system 110 automatically invokes browser-standard download and save functionality to acquire the PDF target(s) from the PACER system 130. Automated notification handling system 110 is configured with functionality to emulate a user's invocation of the standard "save target as" browser function to thereby download one or more PDF documents from PACER which are then stored in a subdirectory in local storage 218 (FIG. 2).

At block 923, an entry is made in table 228 which includes a "to-be-processed" flag and a command line which is utilized by the copy utility 215 (FIG. 2) to move the downloaded documents to target location 239 (FIG. 2). The command line comprises a copy command as well as path and file names for source (i.e., the "FROM" address) and destination (i.e., the "TO" address) to thereby associate the identity and location of each downloaded document with related case data 230 (FIG. 2), such as file number and client identification, from the case management system 122 (FIG. 2).

At block 930, copy utility 215 is arranged to continuously poll table 228 to look for new entries that are awaiting processing (as indicated by the to-be-processed flag noted above). Copy utility 215 reads the table information and command line and executes the command line to thereby copy the downloaded documents to the target location 239 as indicated in block 952. In the event that the specified destination directory does not exist, copy utility 215 creates the directory path specified in table 228. Copy utility 215 further verifies the existence that the file referred to in the specified destination in table 228 exists, and if so, copy utility updates the table entry flag as copied. If the existence of the copied file is not verified, copy utility 215 logs a fail and stops processing In this case the to-be-processed flag continues so that processing for the entry will be attempted in the next polling. If after some set number of attempts the entry is unsuccessfully processed (i.e., a successful copy remains unverified, an error message is generated and sent to an administrator for further review or action. The illustrative method 900 ends at block 960.

Figure 10:
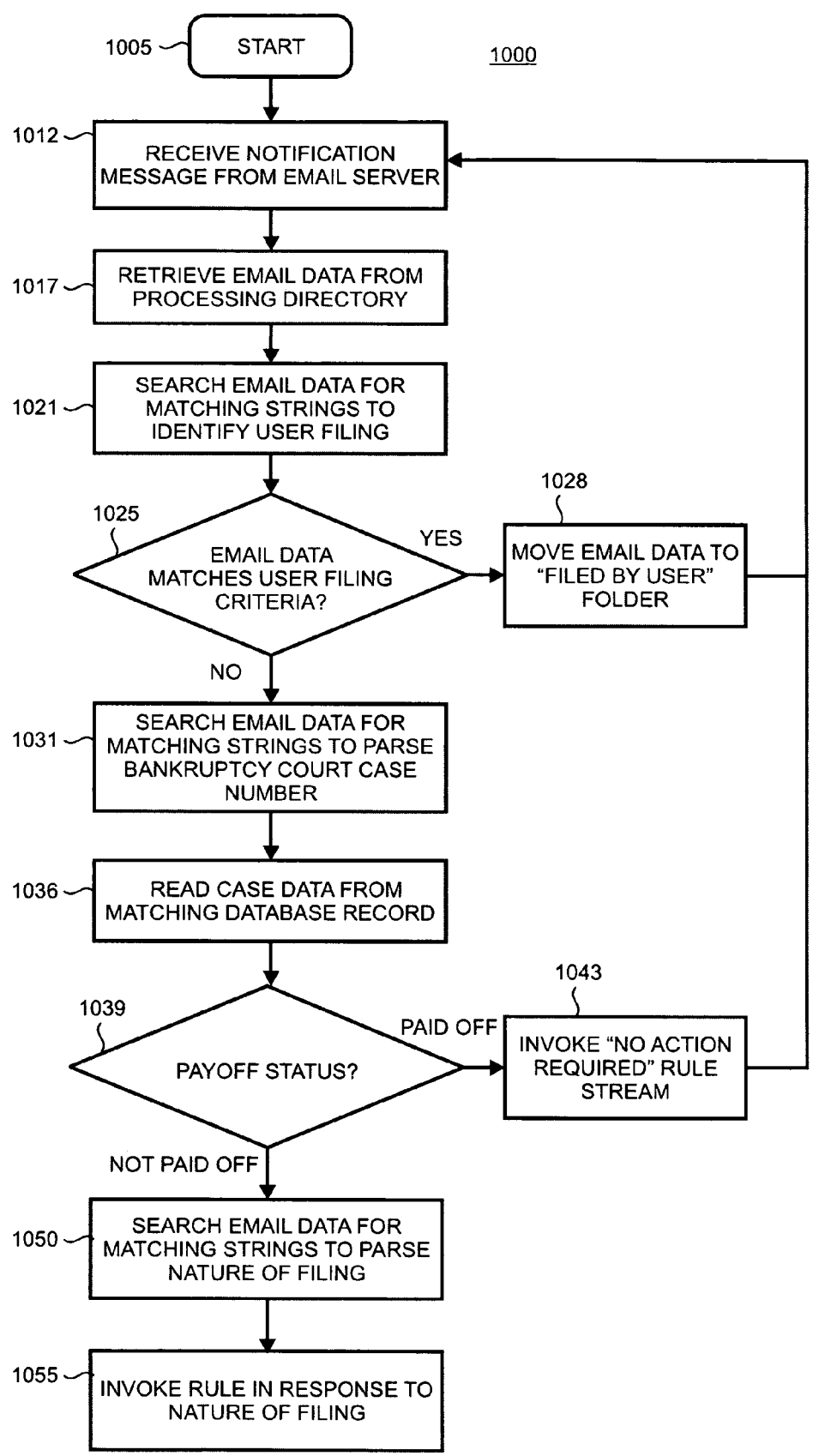
FIG. 10 is a flow chart for an illustrative method for providing automated notification handling.

FIG. 10 is a flow chart for an illustrative method 1000 for providing automated notification handling. In this illustrative example, method 1000 is performed by automated notification handling system 110 (FIG. 1). The illustrative method starts at block 1005. At block 1012, message 204 (FIG. 2) is received to thereby notify automated notification handling system 110 that notification email data is stored in the active processing directory 327 (FIG. 3). As noted above, in some applications it may be desirable for message 204 to be utilized as a trigger to invoke the executable code that is typically used to implement the automated notification handling system 110.

At block 1017 automated notification handling system 110 retrieves the notification email data from the active processing directory 327. At block 1021, the notification email data is searched for matching strings which indicate that the notification email is a confirmation of the user's (e.g., the law firm's) own filing with the court. This results when the notification email contains a string that matches with one or more pre-determined users in the law firm. For example, if an attorney named Matthew A. Jones at the law firm files electronically with the court, then a notification email containing the string "The following transaction was received from Jones, Matthew A" will be identified by automated notification handling system 110 as a confirmation of such filing.

At decision block 1025, if the notification email data indicates a confirmation of a user filing, then at block 1028, the notification email data is moved to a folder or subdirectory named "Filed by User," located for example, in either local storage 218 or document storage 236. Control is then returned to block 1012 and the above-described process is iteratively repeated.

If at decision block 1025 the notification email data does not indicate confirmation of a user filing, then at block 1031, automated notification handling system 110 searches the case data 230 (FIG. 2) in case management system 122 (FIG. 2) to locate any records (which typically could be one or more) that match the court case number. In many applications of the invention, automated notification handling system 110 pulls the law firm's internal file number and client identification from the case data when a match is found as indicated by block 1036.

At decision block 1039, case data 230 is read to determine the payoff status of the bankruptcy case. If the status is "Paid Off" then automated notification handling system 110 invokes the "No Action Required" rule stream shown in block 1043 and control is returned to block 1012 whereby the above process is iteratively performed. The "No Action Required" rule stream is shown in FIG. 11 and described in more detail in the accompanying text.

Figure 12:
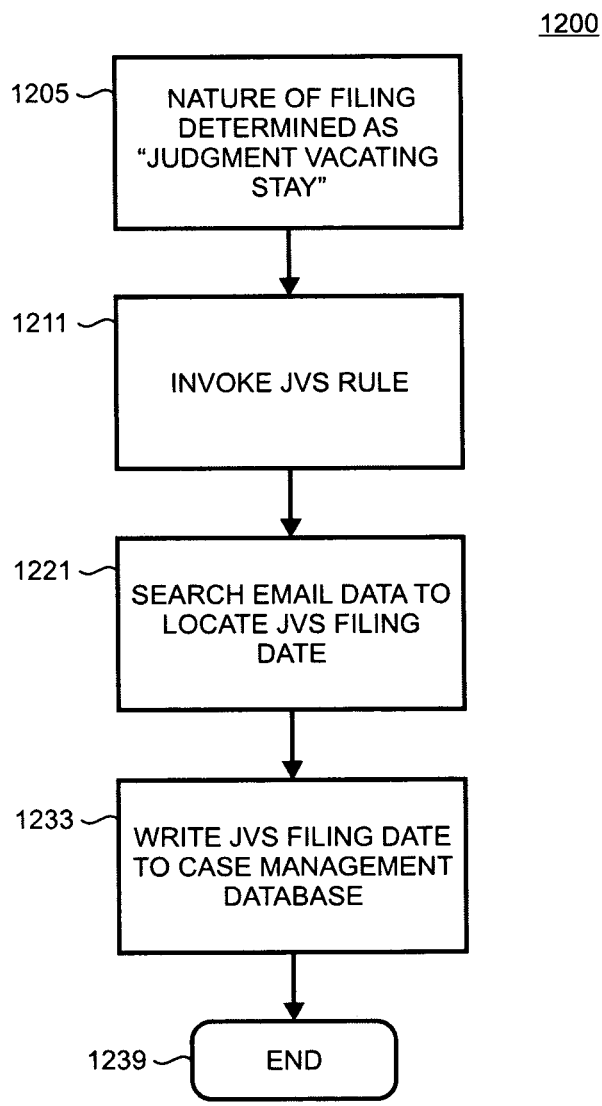
FIG. 12 is a flow chart for an illustrative rule stream for handling a notification pertaining to a judgment vacating stay.

If the status is not paid off, then at block 1050, the notification email data is searched to parse the nature of the filing. At block 1055, a responsive rule is invoked depending on the identified nature of filing. Examples which illustrate two different identified natures of filings are shown in FIGS. 12 and 13 and described in the accompanying text.

Figure 11:
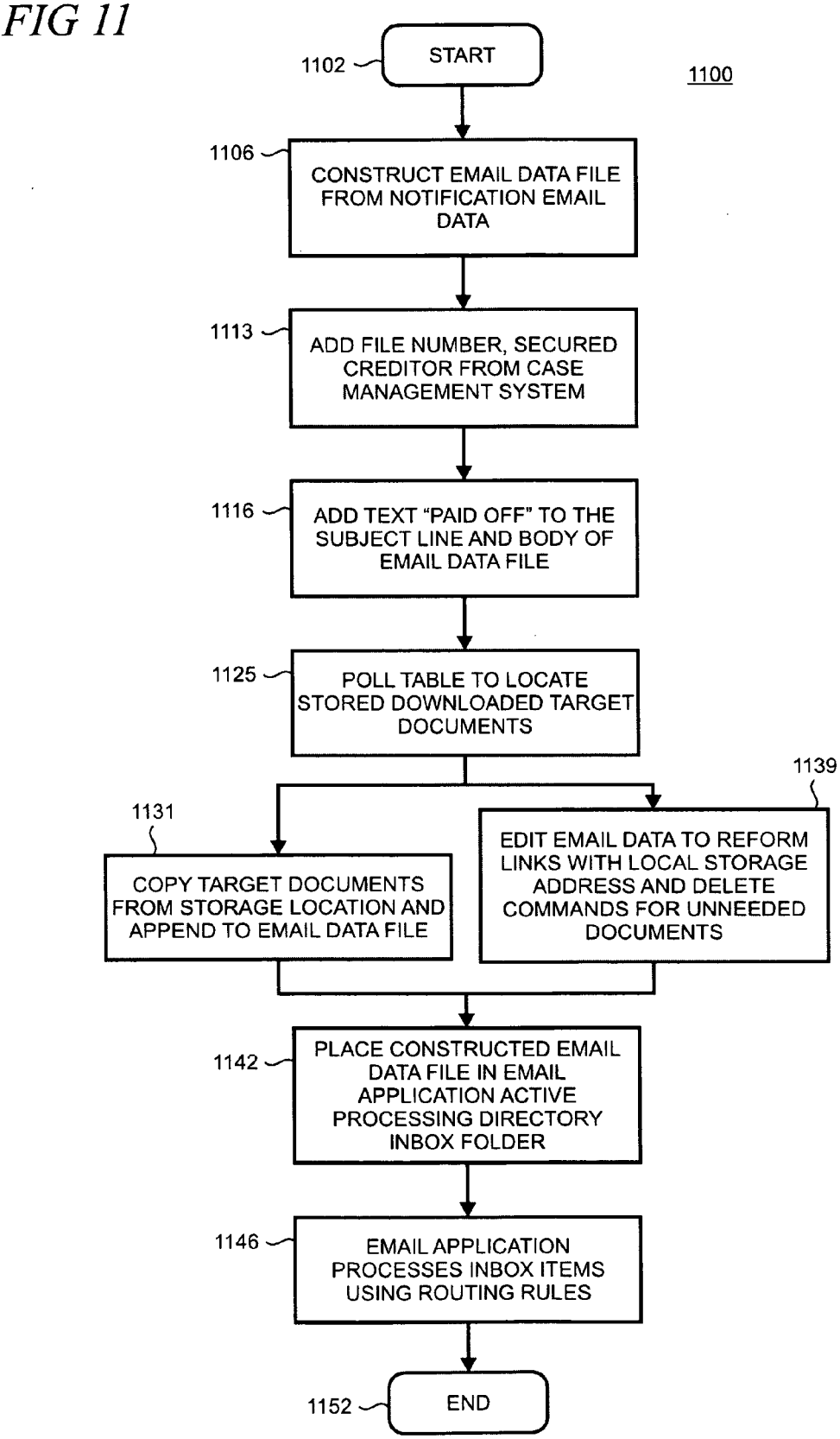
FIG. 11 is a flow chart for an illustrative "no action required" rule stream.

FIG. 11 is a flow chart for an illustrative "no action required" rule stream 1100. In this illustrative example, the rule stream 1100 is invoked by automated notification handling system 110 (FIG. 1). The illustrative rule stream 1100 starts at block 1102. At block 1106, automated notification handling system 110 constructs an email data file from the notification email data. The law firm's internal file number and identification of the secured creditor (i.e., the client) from the case management system 122 (FIG. 2) are added to the constructed email data at block 1113.

At block 1116 in FIG. 11, the text "PAID OFF" is added to the subject line and body of the constructed email data by automated notification handling system 110. At block 1125, copy utility 215 (FIG. 2) polls table 228 (FIG. 2) to locate the source address of the documents downloaded from the PACER system 130 (FIG. 2).

Automated notification handling system 110 is configured to perform alternative processes as shown in blocks 1131 and 1139 in FIG. 11. At block 1131, the downloaded documents are copied and appended to the constructed email data as one or more attachments. At block 1139, the original notification email data placed in the constructed email data is edited to reform the embedded document links to point to the target location 239 (FIG. 2) which stores the downloaded documents. The choice of alternative process is dependent on the requirements of a specific application of the invention. In some application, it may further be desirable to reform the links as well as append the downloaded documents as attachments to the constructed email data. In addition, the reconstructed notification email data may include a provision to delete links to the PACER documents which may enhance productivity in instances when the documents are not required or desired.

At block 1142, automated notification handling system 110 places the constructed email data (including attached downloaded documents when applicable) in the email processing directory inbox folder 222 (FIG. 2). At block 1146, the email application (e.g., Microsoft Outlook® or alternative email programs having similar capabilities) processes the constructed email data using routing rules implemented using its Rules and Alerts feature. In this illustrative example, the Rules and Alerts matches the string "Paid Off" to a "Paid in Full-No Disposition" rule which instructs Outlook to move the constructed email to the "Trash" folder where it remains until deleted (for example, by a 31 day purge rule). The illustrative rule stream 1100 ends at block 1152. In alternative arrangements, Outlook can be configured to move the constructed email locations other than the trash for further processing or handling as may be required by a specific application of the invention.

FIG. 12 is a flow chart for an illustrative rule stream 1200 invoked by automated notification handling system 110 (FIG. 1) for handling a notification pertaining to a judgment vacating stay or "JVS" (which is an order where the court removes the prohibitions on actions against the debtor). At block 1205, upon searching the notification email data, a match is made to the search string "judgment vacating stay" which invokes the JVS rule as indicated in block 1211.

At block 1221, the notification email data is read to locate the JVS filing date. At block 1233 in FIG. 12, the JVS filing date in the case data 230 (FIG. 2) is updated with the JVS filing date from the notification email. In the event that a JVS filing date is not, found in the case data 230, a new field is created and the JVS filing date is populated therein. The illustrative rule stream 1200 ends at block 1239.

FIG. 13 is a flow chart for an illustrative rule stream 1300 invoked by automated notification handling system 110 (FIG. 1) for handling a notification pertaining to an opposition to a filing of a Chapter 13 plan. Chapter 13 is a section of U.S. bankruptcy code that typically is used by individual or small business debtors to repay creditors while retaining certain assets. At block 1301, upon searching the notification email data, a match is made to both the search strings "Opposition" and "Plan" which invokes the Opposition rule as indicated in block 1305.

At block 1311, the notification email data is read to locate the secured creditor (e.g., Wells Fargo Home Mortgage). At block 1315, the secured creditor from the notification email is compared against the secured creditor identified in the case data 230 (FIG. 2) in the case management system 122 (FIG. 2). At decision block 1322 if the secured creditor is identified in the case data 230 as "MERS" then the MERS rule is invoked to acquire the client name as shown at block 1335. If the secured creditor is not identified as MERS, then control passes to 1355. MERS is an acronym for "Mortgage Electronic Registration System." MERS is the legal entity that is recorded as the mortgagee for loans registered on the MERS system which includes a number of real estate finance industry members.

At block 1335, the MERS rule is invoked to acquire the client name from the case data 230 in case management system 122. At decision block 1337 a comparison is made between the client name in case data 230 and the secured creditor in the notification email data. If a match is not found, then the notification email is flagged for review by a user as indicated at block 1340 and the illustrative rule stream 1300 ends at block 1345. If a match is found at decision block 1337, then an "Action Required" rule stream is invoked at block 1355. This rule stream is described below.

FIG. 14 is a flow chart for an illustrative "action required" rule stream 1400 invoked by automated notification handling system 110 (FIG. 1) when following the process shown in FIG. 13 and described in the accompanying text. The illustrative rule stream 1400 starts at block 1404. At block 1406, automated notification handling system 110 constructs an email data file from the notification email data. The law firm's internal file number and identification of the secured creditor (i.e., the client) from the case management system 122 (FIG. 2) are added to the constructed email data at block 1410.

At block 1416 in FIG. 11, the text "OPPOSITION" is added to the subject line and body of the constructed email data by automated notification handling system 110. At block 1418, copy utility 215 (FIG. 2) polls table 228 (FIG. 2) to locate the source address of the documents downloaded from the PACER system 130 (FIG. 2).

Automated notification handling system 110 is configured to perform alternative processes as shown in blocks 1421 and 1425 in FIG. 14. At block 1421, the downloaded documents are copied and appended to the constructed email data as one or more attachments. At block 1425, the original notification email data placed in the constructed email data is edited to reform the embedded document links to point to the target location 239 (FIG. 2). The choice of alternative process is dependent on the requirements of a specific application of the invention. In some application, it may further be desirable to reform the links as well as append the downloaded documents as attachments to the constructed email data.

At block 1431, automated notification handling system 110 places the constructed email data (including attached downloaded documents when applicable) in the email processing directory inbox folder 222 (FIG. 2). At block 1433, the email application (e.g., Microsoft Outlook®) processes the constructed email data using routing rules implemented using the Rules and Alerts feature as described above in the text accompanying FIG. 11. In this illustrative example, the Rules and Alerts matches the string "OPPOSITION" to an Opposition rule which instructs Outlook to forward the constructed email to a designated individual in the law firm, for example, an attorney named David Smith. The illustrative rule stream 1400 ends at block 1441.

FIG. 15 is a screen shot 1500 of an illustrative user interface for interacting with rules-based email routing as may be implemented using a commercially available email application such as Microsoft Outlook®. As shown in FIG. 15, a number of mail rules 1505 are input into the email application, including the Opposition rule note above. As indicated by the rule description 1508 in FIG. 15, the email data constructed above, as described in the text accompanying FIG. 14, is routed to attorney David Smith because the word "Opposition" was inserted into the subject by automated notification handling system 110.

Figure 16:
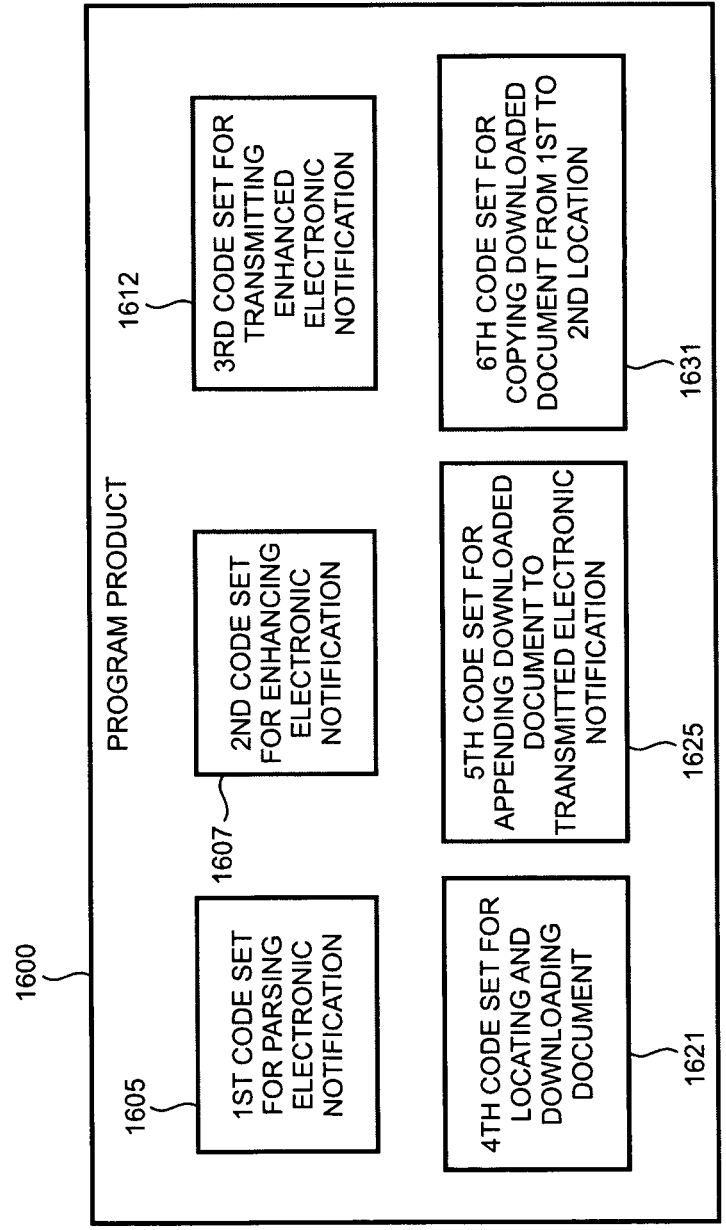
FIG. 16 is a block diagram of a first program product comprising a plurality of code sets for implementing automated notification handling.

FIG. 16 is a block diagram of a first program product 1600 comprising a plurality of code sets for implementing automated notification handling. Program product 1600 includes a plurality of code sets as shown in FIG. 16. Program product 1600 is configured to run on an electronic device such as a computer or server to thereby implement automated notification handling as described above.

The first code set 1605 is arranged to implement automated parsing of an electronic notification, such as notification email from a federal court, to locate data of interest, for example the bankruptcy court case number. The second code set 1607 is arranged to implement automated enhancing of the electronic notification, for example by locating related case data from a case management system database (such as a file number and secured creditor or client identification) which is then appended to the electronic notification. The third code set 1612 is arranged to implement automated transmitting of the enhanced electronic notification using rules-based routing, or alternatively to a directory, folder or other location for rules-based routing by another code set or application such as an email application.

The fourth code set 1621 is arranged to implement automated locating and downloading of linked documents, such as bankruptcy filings, from a document database like PACER. The fifth code set 1625 is arranged to implement automated appending of the downloaded documents to the enhanced electronic notification. The sixth code set 1631 is arranged to implement automated copying of the downloaded documents from a first location (such as a local storage or memory) to a second location (such as a target location or target memory).

Figure 17:
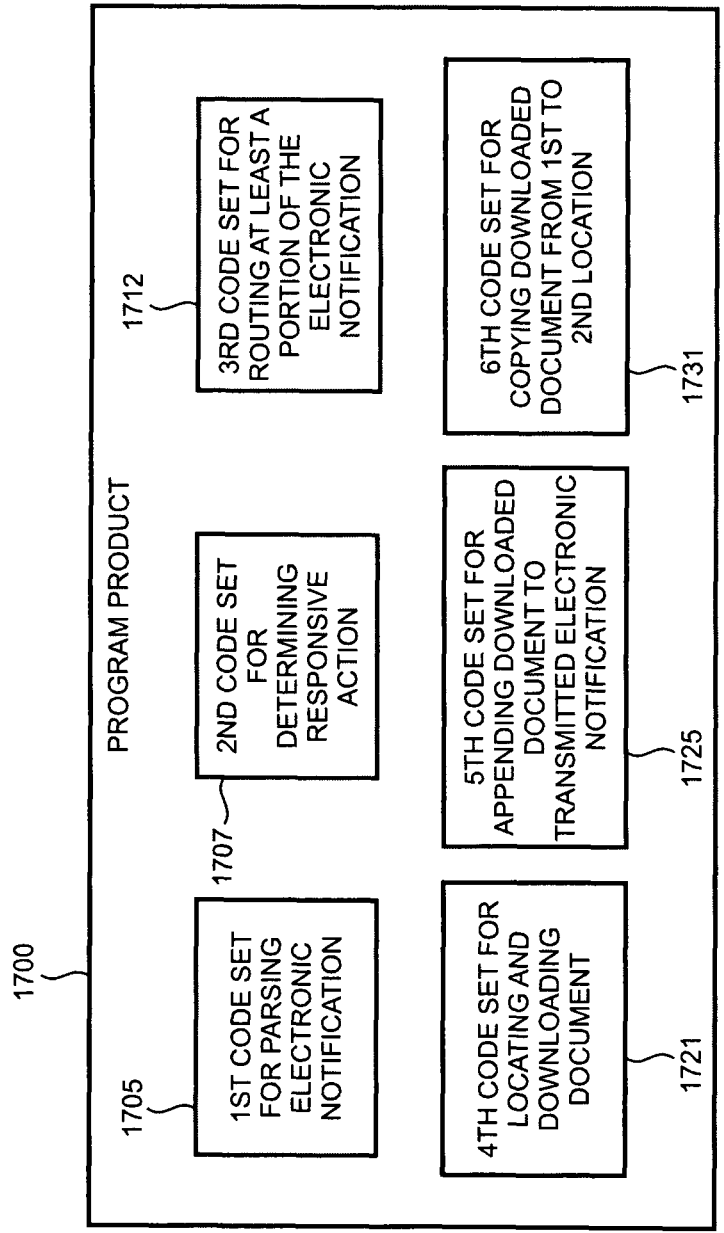
FIG. 17 is a block diagram of a second program product comprising a plurality of code sets for implementing automated notification handling.

FIG. 17 is a block diagram of a second program product comprising a plurality of code sets for implementing automated notification handling. Program product 1700 includes a plurality of code sets as shown in FIG. 17. Program product 1700 is configured to run on an electronic device such as a computer or server to thereby implement automated notification handling as described above.

The first code set 1705 is arranged to implement automated parsing of an electronic notification such as notification email from a federal court to locate data of interest, for example the bankruptcy court case number. The second code set 1707 is arranged to implement automated determination of responsive handling for the electronic notification. For example, the second code set 1707 uses a combination of string searching and rules invocation to determine the required next actions for handling the electronic notification or can automatically dispose of the electronic notification if no action is required. The third code set 1712 is arranged to implement automated routing of at least a portion of the electronic notification using rules-based routing, or alternatively to a directory, folder or other location for rules-based routing by another code set or application such as an email application.

In a similar manner as with program product 1600 in FIG. 16, the fourth code set 1721 is arranged to implement automated locating and downloading of linked documents such as bankruptcy filings from a document database like PACER. The fifth code set 1725 is arranged to implement automated appending of the downloaded documents to the enhanced electronic notification. The sixth code set 1731 is arranged to implement automated copying of the downloaded documents from a first location (such as a local storage or memory) to a second location (such as a target location or target memory).

Other features of the invention are contained in the claims that follow.

what is claimed is:

1. A non-transitory computer-readable storage medium storing instructions which, when executed by one or more processors in an electronic device, perform an automated method comprising the steps of:
    receiving inbound email sent by a court at an email server hosting a mailer-daemon application;
    applying one or more recognition rules at the mailer-daemon application to determine whether the inbound email is a notification sent by a court regarding a court filing pertaining to a case that is accessible by a user who is unaffiliated with the court, the notification including one or more embedded links to respective one or more legal documents;
    configuring the mailer-daemon application for identifying and scraping relevant data from the bankruptcy notification, storing the relevant data in an active processing directory, and sending a message that a bankruptcy notification was received and is available for processing;
    retrieving the relevant data from the active processing directory in response to the message;
    matching the relevant data retrieved from the active processing directory with case data relating to the one or more legal documents, the case data being stored in a case management system database;
    following the one or more embedded links to retrieve the one or more legal documents;
    storing the retrieved one or more legal documents in a target location in a local store;
    reforming the embedded links so that the reformed links point to the target location in the local store;
    applying one or more rule streams to the retrieved data from the bankruptcy notification or the case data from the case management system database, the rule streams invoking a work flow for i) identifying the court filing's type, ii) ascertaining one or more activities reported in the bankruptcy notification, iii) determining a degree of relevance of the activities to the user's interest in which the interest is variable and is different for different activities, iv) determining if a response to the bankruptcy notification is needed, and v) determining, based on one or more of the type, activities degree of relevance, and response needed, if handling of the bankruptcy notification by human personnel is warranted;
    enhancing the notification by generating one or more new data objects responsively to the application of the rule streams and the degree of relevance, the new data objects being supplemental to existing data objects in the bankruptcy notification and in the case data so as to facilitate the handling by human personnel;
    adding the one or more new data objects to an output; and
    sending the output comprising the reformed links and a portion of at least one of new data objects, the bankruptcy notification data, or the case data to designated human personnel.

2. The non-transitory computer-readable storage medium of claim 1 in which the court is a federal court.

3. The non-transitory computer-readable storage medium of claim 1 in which the email notification from the court pertains to a bankruptcy matter.

4. The non-transitory computer-readable storage medium of claim 1 in which the document pertains to a bankruptcy matter.

5. The non-transitory computer-readable storage medium of claim 1 further including a step of storing the document in the target location.

6. The non-transitory computer-readable storage medium of claim 1 in which the output comprises an email.

7. The non-transitory computer-readable storage medium of claim 6 further including a step of routing the email to an email recipient in accordance with routing rules.

8. The non-transitory computer-readable storage medium of claim 7 in which the routing rules are implemented using a rules engine embodied in an email software application.

9. The non-transitory computer-readable storage medium of claim 7 in which the routing rules determine routing of the email based on content in the output.

10. The non-transitory computer-readable storage medium of claim 9 in which a key word in the content is used as a basis for routing.

11. The non-transitory computer-readable storage medium of claim 9 in which a string in the content is used as a basis for routing.

12. The non-transitory computer-readable storage medium of claim 11 in which the string includes the word Opposition.

13. The non-transitory computer-readable storage medium of claim 1 in which the output comprises a file readable by a markup language selected from one of XML, HTML, XHMTL, or SGML.

14. The non-transitory computer-readable storage medium of claim 13 in which the XML file includes a tag which implements a routing rule.

15. The non-transitory computer-readable storage medium of claim 1 in which the output comprises a plaintext file.

16. The non-transitory computer-readable storage medium of claim 1 in which the one or more links point to an object provided by an online subscription-based system.

17. The non-transitory computer-readable storage medium of claim 1 in which the one or more links point to an object served by PACER (Public Access to Court Electronic Records).

18. The non-transitory computer-readable storage medium of claim 1 in which the document is an Adobe® PDF (Portable Document Format) file.

19. The non-transitory computer-readable storage medium of claim 1 in which the document is formatted as a text file, word-processing file, picture file, or image file.

20. The non-transitory computer-readable storage medium of claim 1 in which the identified case data is a subset of data stored in a case management database.

21. The non-transitory computer-readable storage medium of claim 1 in which the case data is retrieved from an external system including a database that includes data pertaining to one of bankruptcy data, title data, loan data, foreclosure data, or legal data.

22. The non-transitory computer-readable storage medium of claim 21 in which the title data comprises real property title data or personal property title data.

23. The non-transitory computer-readable storage medium of claim 21 in which the loan data comprises loan servicing data or lender data.

24. The non-transitory computer-readable storage medium of claim 1 further including a step of updating data stored by the case management database with a portion of the email notification data.

25. The non-transitory computer-readable storage medium of claim 1 in which the output is routed using routing rules.

26. The non-transitory computer-readable storage medium of claim 1 in which the identifying is performed by string searching the email notification data.

27. The non-transitory computer-readable storage medium of claim 26 in which the string searching is performed for a string comprising a bankruptcy court case number.

28. A program product including a non-transitory computer-readable storage medium on which computer code is recorded, the computer code comprising:
   a first code set for parsing an inbound electronic notification sent by a federal court pertaining to a court filing pertaining to a case accessible by a user who is unaffiliated with the court to extract strings contained in the inbound electronic notification that match pre-determined string search criteria;
   a second code set for i) analyzing the extracted strings by invocation of a rule stream configured for determining a nature of the filing, whether a response to the inbound electronic notification is needed, and whether handling by human personnel is warranted to determine a disposition for the inbound electronic notification, ii) using the rule stream for ascertaining one or more activities reported in the inbound electronic notification, determining a degree of relevance of the activities to the user's interest in which the interest is variable and is different for different activities, iii) generating one or more new data objects responsively to the degree of relevance, the one or more new data objects being arranged to enhance existing data objects in the inbound electronic notification so as to facilitate the handling by human personnel, the enhancement comprising at least one of modification, reconstruction, edit, or supplement to the existing data objects, and iv) adding the generated new data objects to portions of the inbound electronic notification;
   a third code set for transmitting the portions of the inbound electronic notification with the added new objects using rules-based routing; and
   a fourth code set for downloading, to a target location in a local store, one or more documents that are identified with embedded links in the electronic notification, reforming the embedded links so that the reformed links point to the target location in the local store, and including the reformed links with the transmitted portions of the inbound electronic notification with the added new objects.

29. The program product of claim 28 in which the string search criteria include the phrase Judgment Vacating Stay.

30. The program product of claim 28 in which the transmitting comprises transmitting to a pre-determined recipient.

31. The program product of claim 28 in which the transmitting comprises transmitting the manipulated electronic notification to a storage area for subsequent processing.

32. The program product of claim 28 in which the transmitting comprises transmitting the manipulated electronic notification to a holding area for electronic files such as a trash bin for later deletion.

33. The program product of claim 28 in which the transmitting comprises transmitting the manipulated electronic notification to a storage area for archiving.

34. The program product of claim 28 further including a fifth code set for appending the one or more downloaded documents to the transmitted manipulated electronic notification.

35. The program product of claim 28 further including a sixth code set for copying the one or more downloaded documents from a first location to a second location.

36. The program product of claim 35 in which the first location is a table or directory.

37. The program product of claim 28 in which the second location is the target location comprising a table or a directory.

38. The non-transitory computer-readable storage medium of claim 1 in which the one or more new data objects comprise at least one of text string, constructed email data file, or attachment.

39. The program product of claim 28 in which the one or more new data objects comprise at least one of text string, constructed email data file, or attachment.

* * * * *

UNITED STATES PATENT AND TRADEMARK OFFICE
CERTIFICATE OF CORRECTION

PATENT NO. : 8,977,692 B1
APPLICATION NO. : 11/491549
DATED : March 10, 2015
INVENTOR(S) : Ackerman et al.

Page 1 of 1

It is certified that error appears in the above-identified patent and that said Letters Patent is hereby corrected as shown below:

In the Specification

Column 4, line 16, the word "requied" should read --required--

Signed and Sealed this
Sixteenth Day of June, 2015

Michelle K. Lee
*Director of the United States Patent and Trademark Office*